United States Patent [19]

Flon et al.

[11] Patent Number: 5,774,642
[45] Date of Patent: Jun. 30, 1998

[54] ARCHITECTURE FOR DYNAMIC SERVICE PROCESSOR EXCHANGE PROVIDING MULTITASKING ENVIRONMENT WHERE MULTIPLE PROCESSORS HAVE ACCESS TO A SYSTEM CONFIGURATION TABLE

[75] Inventors: Robert Flon, Versailles; Jean-François Bonnafoux, Lamorlaye, both of France

[73] Assignee: Bull S.A., Paris, France

[21] Appl. No.: 621,862

[22] Filed: Mar. 25, 1996

Related U.S. Application Data

[63] Continuation of Ser. No. 391,618, Feb. 21, 1995, abandoned, which is a continuation of Ser. No. 852,128, filed as PCT/FR91/00613 Jul. 24, 1991 published as WO92/02878 Feb. 20, 1992, abandoned.

[30]  Foreign Application Priority Data

Aug. 9, 1990 [FR] France ................................. 90 10180

[51] Int. Cl.[6] .......................................................... G06F 11/14
[52] U.S. Cl. ............................... 395/182.11; 395/182.02; 395/182.03; 395/182.09; 395/200.5; 395/200.68; 395/800.15; 395/182.21; 395/182.22; 395/701; 711/104
[58] Field of Search .................................... 395/800, 431, 395/489, 180, 182.03, 182.04, 182.05, 182.11, 600, 650, 182.02, 182.09, 200.5, 200.68, 800.15, 182.21, 182.22, 701; 711/104

[56]  References Cited

U.S. PATENT DOCUMENTS

| | | | |
|---|---|---|---|
| 4,014,005 | 3/1977 | Fox et al. | 340/172.5 |
| 4,894,828 | 1/1990 | Novy et al. | 371/11.3 |
| 4,984,240 | 1/1991 | Keren-Zvi et al. | 371/8.2 |
| 5,008,805 | 4/1991 | Fiebig et al. | 364/184 |
| 5,148,433 | 9/1992 | Johnson et al. | 371/11.3 |
| 5,161,102 | 11/1992 | Griffin et al. | 395/800 |
| 5,396,629 | 3/1995 | Bonnafoux | 364/700 |
| 5,592,676 | 1/1997 | Bonnafoux | 395/701 |

FOREIGN PATENT DOCUMENTS

| | | |
|---|---|---|
| 0083422 | 7/1983 | European Pat. Off. . |
| 0216353 | 1/1987 | European Pat. Off. . |
| 0216353 | 4/1987 | European Pat. Off. . |
| 0348293 | 12/1989 | France . |

OTHER PUBLICATIONS

"Asymmetric Multiprocessing System", IBM Technical Disclosure Bulletin, vol. 29. No. 4, Sep. 1986 (New York, US), p. 1614.

"Dual Service Processor Backup System", IBM Technical Disclosure Bulletin, vol. 29, No. 4, Sep 1986 (New York, US), p. 1631.

Van Wolverton, *Running MS DOS*, pp. 26–29.

*Primary Examiner*—Tod R. Swann
*Assistant Examiner*—Denise Tran
*Attorney, Agent, or Firm*—Weingarten, Schurgin, Gagnebin & Hayes LLP

[57]  ABSTRACT

A computer system for dynamic service processor exchange comprising a first, active service processor connected by a network and a maintenance unit (CMU) to a central system (4) and to a second, backup service processor (2). Each service processor has, in addition to an operating system, a supervisor processor and at least one service broken down into two portions, namely a "body" portion comprising a service processor and a "presentation" portion comprising an interface with the operator allowing a display of the window type with a menu bar. Each service processor further has a maintenance station handler interface (10,20) for processing communications with other service processors by means of the maintenance unit (CMU). The supervisor processor manages the numbers in question and the services, starts the services, and has access to a system configuration table. The computer system permits dynamic service exchange between the active and the backup service processors without the use if system dependent service processors.

5 Claims, 3 Drawing Sheets

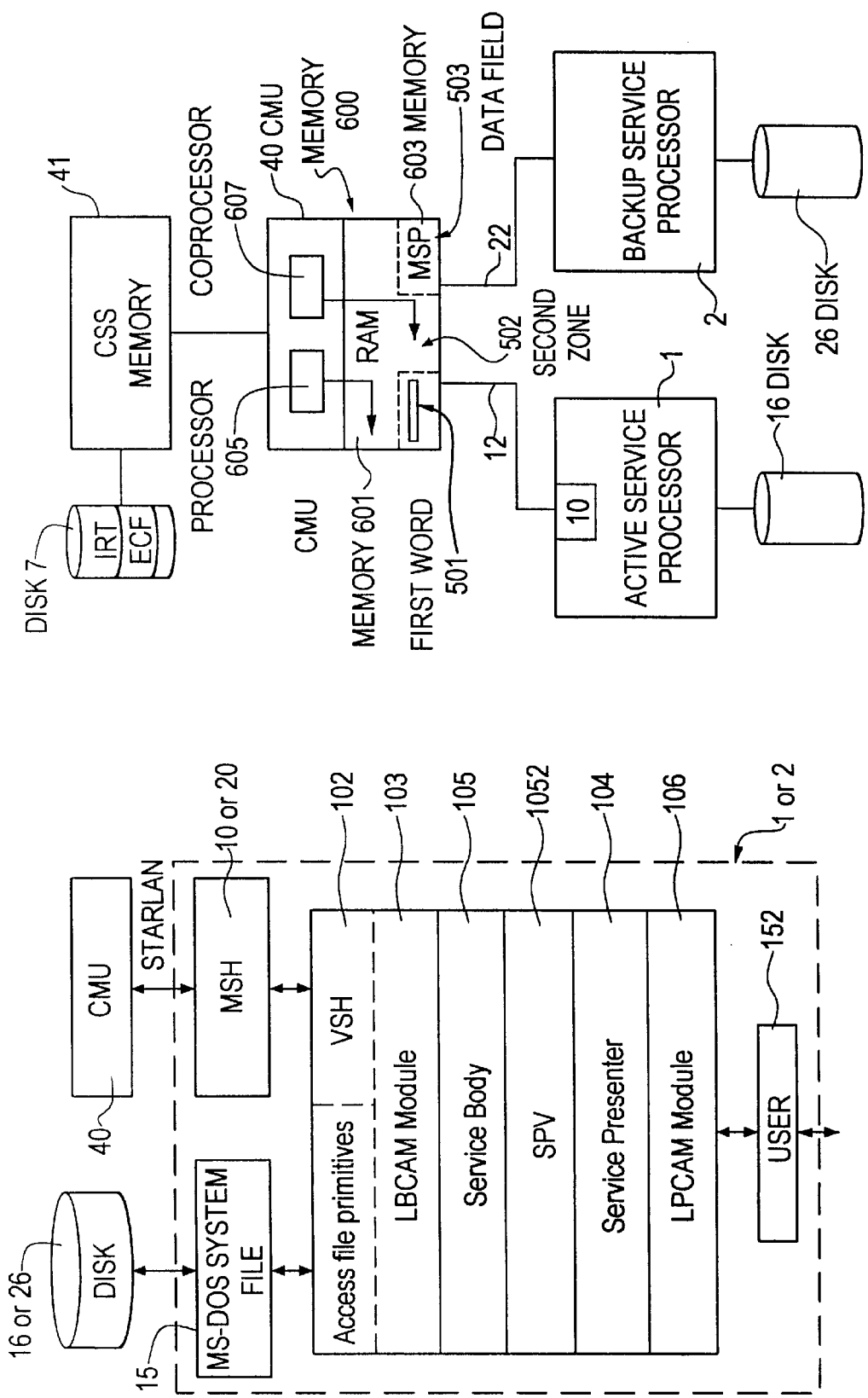

ARCHITECTURE FOR DYNAMIC SERVICE PROCESSOR EXCHANGE PROVIDING MULTITASKING ENVIRONMENT WHERE MULTIPLE PROCESSORS HAVE ACCESS TO A SYSTEM CONFIGURATION TABLE

This application is a continuation of application Ser. No. 08/391,618, filed Feb. 21, 1995. now abandoned which is a continuation of application Ser. No. 07/852,128, filed as PCT/FR91/00613 Jul. 24, 1991 published as WO92/02878 Feb. 20, 1992, now abandoned.

FIELD OF THE INVENTION

The present invention relates to an architecture for dynamic service-processor exchange.

BACKGROUND OF THE INVENTION

In a redundant configuration of a system, there are two service processors: one is active and carries out service functions at a given time; the other is the backup service processor and carries out service functions if the active processor fails. Since hardware is becoming more and more reliable, the backup service processor is not frequently called upon (it is however useful to achieve approximately 100% system availability). Hence the backup service processor is unused for most of the time.

SUMMARY OF THE INVENTION

To improve the overall operability of the service processor, it is desirable to use the backup service processor at times when it is inactive, not as such but as a screen to provide one operator with the option of carrying out a service function from the screen of the active service processor and to allow another operator to carry out another service function from the screen of the backup service processor.

This is possible if a multitasking multiwindow environment of the WINDOWS type is available, allowing a window to be associated with each service function.

If, in addition, the architecture proposed in the patent is adopted, to operate a service from the screen and keyboard of the backup service processor one need only switch the presentation of a service to the backup service processor. If the latter fails, the presentation is dynamically transferred to the active service processor with no interruption in service.

Moreover, if the description of a system is known from a table, it is necessary for the service processor to know this table to proceed to the "system initialization" and "system reconfiguration" service operations.

The disk of the service processor can be configured by copying the system configuration table from one of its files. The major drawback of such a solution resides in the fact that the service processor becomes system-dependent. In particular, no "standard exchange" of the service processor can be effected. A configuration must be made after the exchange.

A first goal of the invention is to propose an architecture allowing a dynamic service-processor exchange. This goal is achieved by the fact that the architecture allowing a dynamic service-processor exchange comprises a first service processor connected by a network and the central system maintenance unit (CMU) to a central system (4), said service processor (1) is connected to a second backup service processor (2) by the network, and the maintenance unit (CMU) is characterized by each service processor having, in addition, operating system programs, a supervisor program, and at least one service broken down into two applications: the "body" composed of the algorithm of the program and the "presentation" comprising the interface with the operator allowing a display of the window type with a menu bar, and MSH (maintenance station handler) means (10, 20) for processing communications with the other service processors by means of maintenance unit (CMU), a supervisor program managing the numbers in question of the services and starting the services, said supervisor program having access to a system configuration table.

According to another characteristic, the architecture is characterized by the maintenance unit having a random access memory which communicates through the central system with a central system storage means, which contains the system configuration table IRT (resource installation table), and by the supervisor of the active service processor and the backup service processor containing a CMU access method routine LBCAM to access the system configuration table contained in the central system storage means, transfer it to its own disk (16), and load it into the random access memory of the maintenance unit.

According to another characteristic, the architecture is characterized by the supervisor program of the backup service processor containing a routine which, in the event of a failure manifested by an event sent by the CMU to the backup service processor, launches the supervisor program of the backup service processor, and by the LBCAM routine reading configuration table IRT from the random access memory of the maintenance unit to copy it onto the hard disk (26) of the backup service processor.

According to another characteristic, the random access memory is divided into two parts; one is accessible only by a processor of maintenance unit CMU, and the other, MSP, is accessible only by the coprocessor of maintenance unit CMU, executing messages sent by the access method routine to the CMU, which routine is launched by a service running on the service processor.

According to another characteristic, the MSP part of the CMU memory is divided into three zones:
 a first zone containing a word indicating the current length of the memory;
 a second list zone containing the file labels;
 a third zone containing the data.

According to another characteristic, the labels in the second zone contain the file name, its allocated space, its creation date, and its current size;
 information indicating whether the allocated space is fixed or variable;
 and a flag which, when its value is 1, indicates that a write session has not been validly executed.

According to another characteristic, the routine of the access method displays the message "file not found" if the flag was at value 1 and proceeds to copy the file from the CMU to the disk or vice versa.

According to another characteristic, the routine of the access method displays the message "file unknown" if the name of the file does not exist in the CMU list and proceeds to copy it if it exists, to the service processor disk.

According to another characteristic, files managed by the access method of the CMU are copied from the hard disk to the CMU random access memory when the hardware interface board has been switched off.

According to a last characteristic, the files managed by the access method of the CMU are copied from the random access memory of the CMU to the hard disk of a service processor when a service processor is initialized.

BRIEF DESCRIPTION OF THE DRAWING

Other characteristics and advantages will emerge from reading the description below with reference to the attached drawings wherein:

FIG. 4 represents the architecture diagram of the software necessary for working the invention;

FIG. 5 represents the diagram of the hardware architecture necessary for working the invention.

DESCRIPTION OF THE PREFERRED EMBODIMENT

For the purposes of describing the present invention, the following acronyms have the following associated meanings: MSP means Maintenance Station Processor, CSS means Central Sub System, MPK means Maintenance Processor mild life Kicker, AUSP means Auriga Service Processor, SPV means Supervisor, ECF means Electrical Configuration File, ADMA means Advance Memory Access, and RCFT means Re Configuration File Table.

Figure 1:
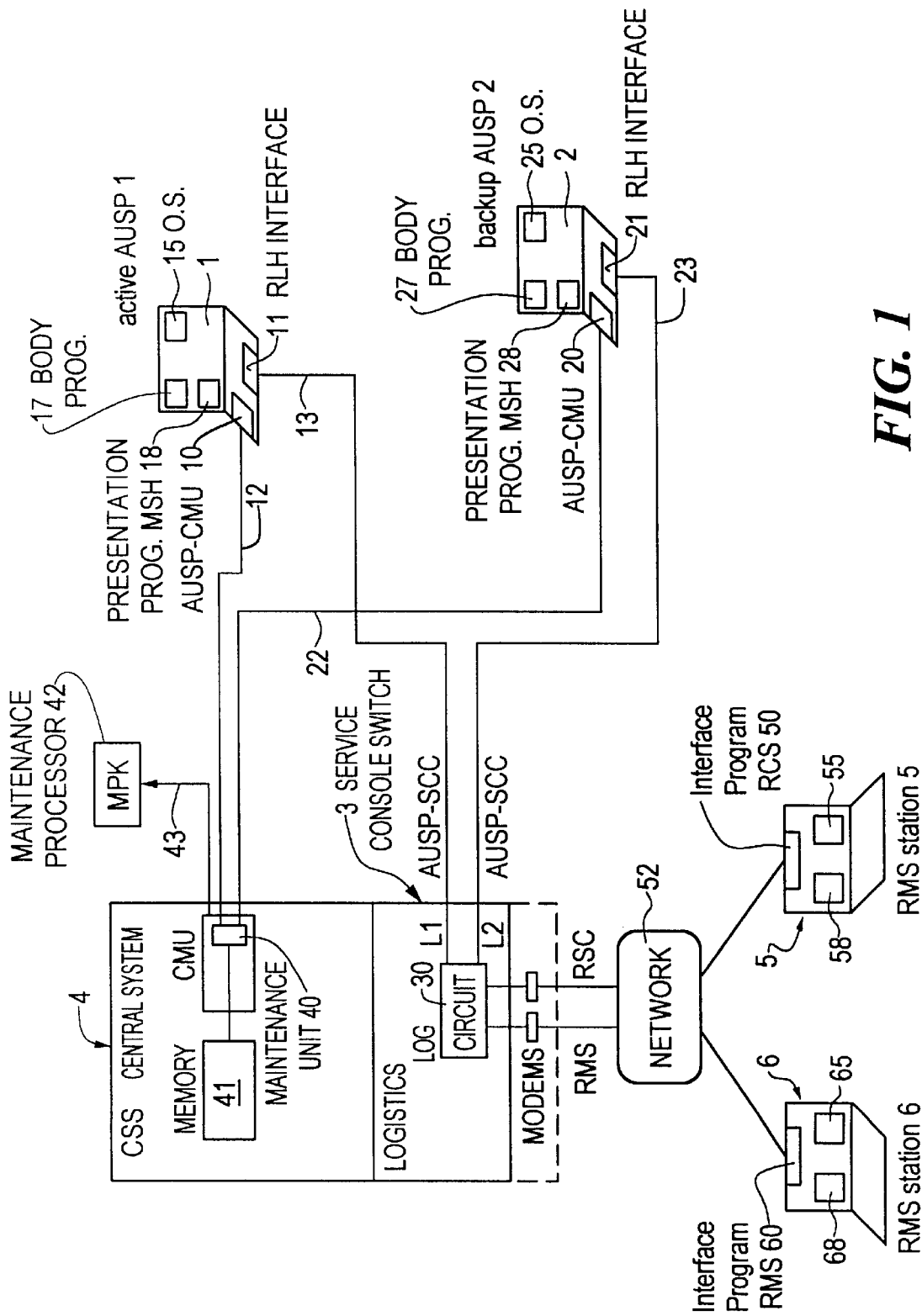
FIG. 1 is an overall diagram of the system.

The system architecture is composed, as shown in FIG. 1, of an active service processor (1) connected by an MSH (maintenance station handler) interface program (10) with a maintenance processing line from the telecommunications stations (12) forming a network of the STARLAN type. This line (12) is connected to a clock and maintenance unit CMU (40) which provides the communications between service processor (1) [and] a second backup service processor (2), via a second line (22), and a central system (CSS) 4 with memory (41). The maintenance and clock unit (CMU) also communicates via a line (43) with a set of maintenance processors (42). The active service processor (1) and the backup service processor (2) also communicate through RLH (remote line handler) interfaces (11) and (21) with a service console switch (3) which, through a circuit (30) and an appropriate switching matrix, allows each of the service processors to be placed in communication with the telecommunications network of a given country, and through this network with a station (5) constituting a remote service console communicating with this network (52) through an interface program RSC (50). Likewise, each of the service processors may be placed in communication, through network (52), with a remote maintenance station (6) communicating with network (52) through an interface program RMS (60). Lines (23) and (13) connected to the service console switch by interface programs (21) and (11) have a speed of 4800 baud while lines (12) and (22) forming the STARLAN network with the clock and maintenance unit (40) have speeds on the order of one megabit per second. Maintenance processors (42) are connected to sets of input-output units for the central system.

Figure 2:
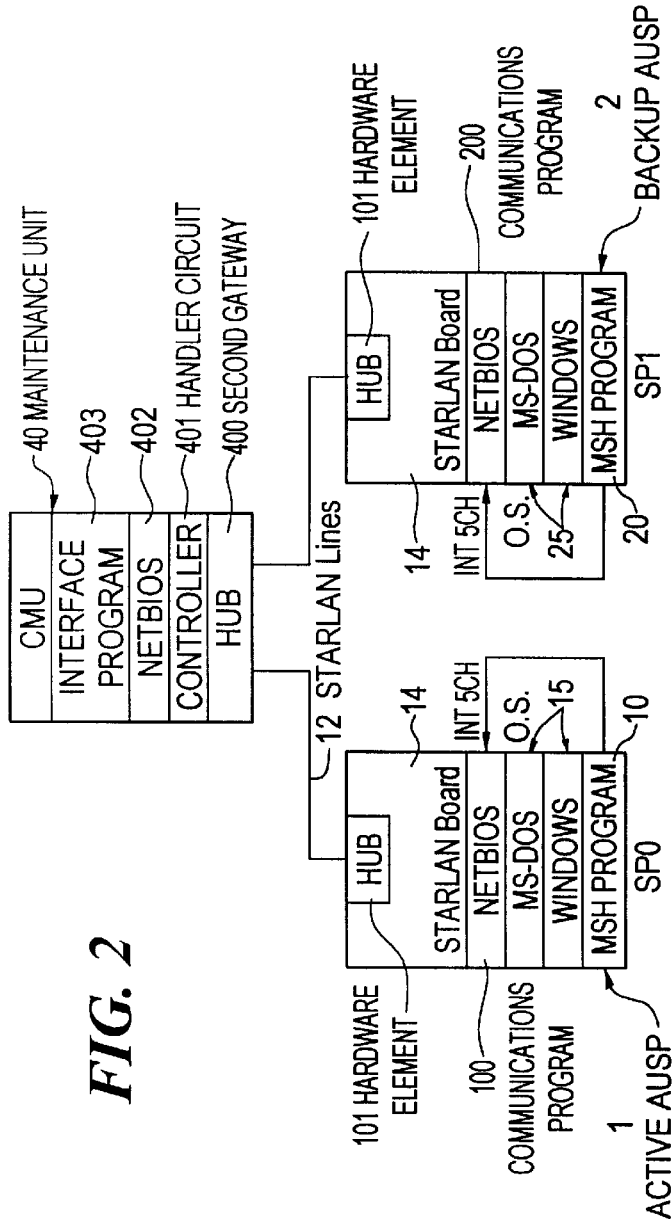
FIG. 2 represents the hardware and software, placing certain parts of the system in communication.

FIG. 2 represents the software environment allowing service processors (1, 2) to communicate via the STARLAN network with maintenance unit CMU (40). The active service processor also has the MSH program (10) and an operating system including the operating system of the MS-DOS disk, a multitasking program with windows such as WINDOWS, and a program part which will be described later. The active service processor also has a communications program "NETBIOS" (100) communicating through a STARLAN type network board (14) and a hardware element (101) constituting a gateway (HUB) through line (12) of the STARLAN network to a second gateway HUB (400), a handler circuit (401), an interface program with the STARLAN network "NETBIOS" (402), and an interface program (403) with service processor RSPI. Similarly, backup service processor (2) will also have the same elements, but with the number 2 as a reference for the tens or hundreds figure. Each service processor also has in addition to its own operating system (15, 25), a body program for a given application (17, 27, FIG. 1) and a presentation program for the application (18, 28, FIG. 1).

A supervisor program SPV handles the numbers in question of the installed services and starts the services. The active and backup service processors are initialized separately in parallel. The difference between a backup service processor and an active service processor is that the active service processor accepts the launching of services while the backup service processor waits for a CMU event telling it to become active. Thus, supervisor SPV of the active service processor (1) sends, through the CMU, an event to second service processor (2) if the first fails, allowing the latter to set the same applications.

Figure 3:
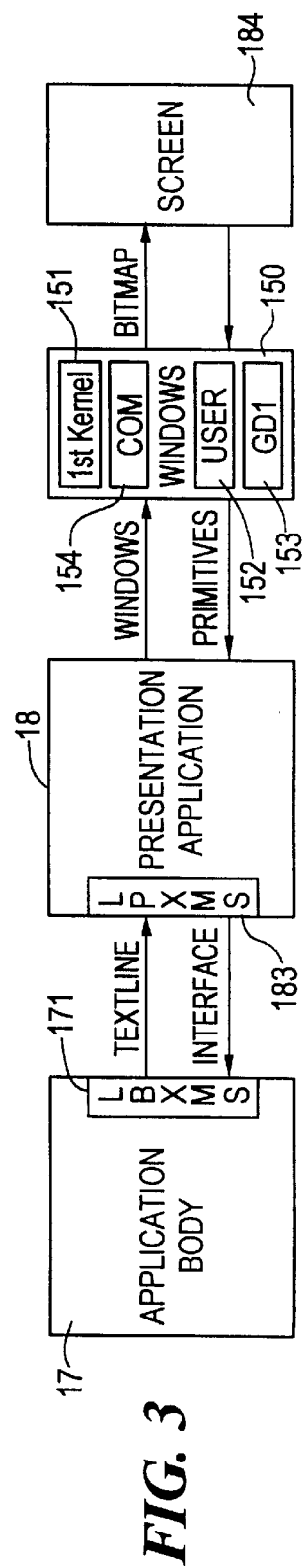
FIG. 3 represents the principle of the communications and presentation architecture used in the invention.

FIG. 3 shows the main features of an architecture necessary for working the invention wherein the body program (17) of a given application, running for example on the active service processor, exchanges text lines and acknowledgement or response messages with the presentation program (18) of the application. These exchanges of messages and text lines are effected by message handling library modules LBXMS (171) and LPXMS (183), with LBXMS being connected to the body of the application and LPXMS to the presentation of the application. The application presentation program exchanges, with the WINDOWS program (150), the primitives necessary for task handling and window display. The presentation application will have been developed with the aid of the WINDOWS program (150) which can be seen as a set of four components. The first kernel component (151) handles tasks, memory allocations, the clock function (TIMER), and dynamic links. A second user element (USER) (152) handles the windows and creates them. A third element (GDI) (153) performs graphic functions in order to make drawings. A fourth element (COM) (154), which is a WINDOWS driver, handles the asynchronous lines of the RS 232 type and a data exchange protocol between DDE (dynamic data exchange) applications allows communications between applications.

Communication with text lines allows the information density to be reduced by comparison with communications composed of a set of WINDOWS primitives which are used to generate a screen 184, and hence speeds up exchanges.

FIG. 4 shows the programs necessary for setting up the means allowing the dynamic service-processor exchange. The CMU (40) is connected by a STARLAN type connection to the MSH program (10) or (20) depending on whether it belongs to the active or the backup service processor. The MSH application dialogues with a library (or a utility) VSH (VMP object sequence handler) handling the object sequence of the VMP program constituting the virtual maintenance panel. The SYC service calls on CAM (CMU file access method) to update the IRT files. CAM itself calls VSH to execute VOS sequences (virtual object sequences) to save the files in the memory (400, 401) of the CMU and hard disk of active service processor (16) or backup service processor (26). This utility has two modules; one, LBCAM, or Library Body CMU Access Method, is the "body" and the other, LPCAM, or Library Presentation CMU Access Method, is the corresponding "presentation module" dialoguing with the WINDOWS User program (152) to ensure presentation on the screen. The service body (105) can be the body of the virtual maintenance panel (VMP) program and the service presentation (104) can be the VMP presentation. The maintenance panel (VMP) allows specific commands to be used, selected resources to be visualized dynamically, directives to be constructed, compiled, and executed, the file list to be displayed, [and] a tutor to be used to construct a line of commands field by field and allow operations such as register read-write, memory read-write, etc.

LBCAM (103) allows hard disk (16) to be accessed, either in the read or the write mode, by means of the file of MS-DOS system (15).

The architecture necessary for the dynamic service-processor exchange process is shown in FIG. 5 in which disk (7), the system disk which contains, among other things, the configuration files (IRT, ECF, RCFT, ROLST, RLLST, EX.LST, and DG.LST) and the functional microprograms of the CSS microprocessor. During initialization of the system, the files on disk (7) are loaded into the CSS memory (41) and the initialization program loads configuration files IRT and ECF into the CSS memory (41), onto hard disk (16) of AUSP (1) on the one hand and into memory (600) of CMU (40) on the other hand. The CMU memory has two parts, one (601), [and] another called (603), each one megabyte in size. Part (601) is accessible only via processor (605) of the CMU while part MSP (605) is accessible by coprocessor (607) ADMA. This coprocessor (607) has an address field which allows it to access the addresses from one megabyte to two megabytes, while processor (605) has an address field allowing the addresses from zero to one megabyte to be accessed. Space MSP is especially reserved for the use of service processor (1) and, among other things, allows the IRT and ECF files to be stored. Memory space MSP is managed and organized by service processor (1) and subdivided into three principal zones:

- a first word 501 containing a value giving the current length of memory MSP. This word is updated by the CMU and has a read-only access attribute for service processor (1);
- a second zone 502 is formed by the list containing the file labels, this list being created and updated by the CMU access method application body (LBCAM);
- a data field 503 containing the data in the files.

This architecture allows backup service processor (2) to be used as a station allowing the presentation of an application to be run while authorizing the system to be taken over by the supervisor of backup service processor (2) in the event the active service processor fails.

In such a case, supervisor SPV (1052) of active service processor (1) requests the launching on backup service processor (2) of the body application being executed on active service processor (1), with or without interruption of the presentation under way, as the case may be.

For this purpose, the system configuration table, which in the prior art was stored on the disk of the active service processor, is, for the needs of the invention, generated upon system initialization on a system disk (7) and not on a service processor disk, then the configuration table is transferred to service processor (1) when the system is first initialized.

Service processor (1) copies this table into part (MSP) (603) of RAM (600) of hardware interface board (40) which becomes the reference, namely service processor (1) accesses the RAM when it uses the configuration table. The two service processors each have an access path to this RAM.

Finally, this table is copied in parallel onto a file on disk (10) of active service processor (1) so that RAM (600) could possibly be reinitialized when hardware interface board, or maintenance unit, (40) has been switched off for some reason or other.

This architecture allows a dynamic service-processor exchange to occur. Upon connection of a new service processor, the latter copies the configuration table of the RAM to its disk. The same operation is effected when active service processor (1) is toggled to the backup service processor (2).

Whenever access to a file is requested, the CAM program accesses the file of labels of the CMU list to determine whether a file is contained or not. The file label format is composed of bits 0 to 7 for the file name, bits 8 to 10 for the name of a file extension, bit 11 to designate whether the allocated space is fixed or variable, bits 12 to 15 to indicate the space allocated in bytes, bits 16 to 19 to indicate the current size of the file in bytes, bits 20 to 23 to indicate the starting address of the file, and bits 24 to 29 to indicate the date of creation. Finally, bits 30 and 31 constitute a flag initialized to zero and set at value −1 whenever the file is being written to. Once the write session is over, the flag is reset to zero. This is a protection against undesired write ends. If the flag is not set to zero when the application asks CAM to read a file, this means that the previous write session was not executed correctly and that the file is invalid. In this case, the CAM module sends the message "file not found." If the name of a file is not found by CAM when it is asked to access a certain file, the latter sends the message "file unknown." After reading the list, the CAM access method sends the message "file not found" if the file is not present in the CMU memory or in the hard disk of the active service processor. If the file is present in the CMU memory but not on the hard disk of the service processor, the access method sends the message "CMU memory.update of hard disk." If the reverse is the case, the access method sends the message "hard disk-service processor.update of CMU."

If the files are present in the CMU memory and the hard disk, the access method sends the message "CMU memory." Whenever necessary, the access method proceeds to update the corresponding element. Other than files ECF and IRT for the backup and active service processors, the access method also handles the system reconfiguration table, the reservation lists R0LST, R1LST for the active and backup service processors, the exclusion list EX.LST, and the diagnostic list DG.LST, as well as the initialization parameters of service processors S0 and S1 contained in the INIT PAR file.

Other modifications within the scope of the individual skilled in the art are also part of the spirit of the invention.

We claim:

1. A computer system comprising a active service processor connected by a network and a maintenance unit (CMU) to a central system (4), said active service processor (1) being connected to a backup service processor (2) by the network end the maintenance unit (CMU), where said active service processor and said backup service processor each have an operating system, a supervisor program, at least one utility comprising a "body" portion and a "presentation" portion comprising an interface with an operator allowing a display of a window type with a menu bar, and a maintenance station handler (MSH) interface (10, 20) for processing communications with other service processors by means of the maintenance unit (CMU), said supervisor program managing the at least one service and starting the at least one service, said supervisor program having access to a system configuration table containing a description of said computer system, said system configuration table being located in a central system storage means which is in communication with said central system (4), wherein the maintenance unit (CMU) has a random access memory (600) which communicates through the central system with said central system storage means containing the system configuration table, and wherein the supervisor program of the active service processor and the backup service processor contain a CMU access method routine (CAM) to access the system configuration table contained in the central system storage means, to transfer said system configuration table to a hard disk (16, 26) of a corresponding one of said active service processor and said backup service processor, respectively, and to load said system configuration table into the random access memory (600) of the maintenance unit (CMU), and wherein the supervisor program of the backup service processor (2) contains a routine which, upon a failure of the active service processor (1) manifested by an event sent by the maintenance unit (CMU) to the backup service processor (2), launches the supervisor program of the backup service processor (2), and by a body CMU access method module (LBCAM) of the CMU access method routine (CAM) of the backup service processor reading the configuration table in the random access memory (600) of the maintenance unit (CMU) to copy said configuration table from said random access memory (600) onto the hard disk (26) of the backup service processor (2), and wherein said random access memory (600) is divided into first and second parts, said first part (601) accessible only by a processor (605) of the maintenance unit (CMU), and said second part being a maintenance station processor (MSP) accessible only by a coprocessor (607) of the maintenance unit (CMU) by executing messages sent by the CMU access method routine (CAM) to the maintenance unit (CMU), said CMU access method routine (CAM) being launched by said active service processor (1), and wherein the MSP part of the random access memory is divided into three zones:
  a first zone containing a word indicating current length of the memory;
  a second list zone containing file labels; and
  a third zone containing data, and wherein
the labels in the second zone contain:
  file information including a file name, allocated space for the file, creation date of the file, and current size of the file;
  information indicating whether the allocated space is fixed or variable; and
  a flag having a value which indicates that a write session has not been validly executed.

2. The computer system according to claim 1, characterized by the CMU access method routine (CAM) of the active service processor displaying a message having a meaning "file not found" if the value of the flag is a predetermined value, and copying the file from the maintenance unit (CMU) to a disk (10) of the active service processor (1).

3. The computer system according to claim 1, characterized by the CMU access method routine (CAM) displaying the message "file unknown" if a name of a file does not exist in a CMU list and copying said file from the hard disk (16) to the random access memory (400) of the maintenance unit (CMU) if said file exists in the hard disk (16) of the service processor (1).

4. The computer system according to claim 3, characterized in that files managed by the CMU access method routine (CAM) are copied from the hard disk (16) to the random access memory (400) of the maintenance unit (CMU) after the maintenance unit (CMU) has been switched off.

5. The computer system according to claim 3, characterized in that files managed by the CMU access method routine (CAM) are copied from the random access memory (400) to the hard disk (16, 26) of one of the service processors (1, 2) when one of the service processors is initialized.

* * * * *

UNITED STATES PATENT AND TRADEMARK OFFICE
CERTIFICATE OF CORRECTION

PATENT NO. : 5,774,642  
DATED : June 30, 1998  
INVENTOR(S) : Robert Flon, et al.

Page 1 of 1

It is certified that error appears in the above-identified patent and that said Letters Patent is hereby corrected as shown below:

Column 5,  
Line 17, "ROLST, RLLST", should read -- RDLST, R1LST --;  
Line 25, "another called (603)", should read -- another called MSP603 --;  
Line 27, "MSP (605)", should read -- MSP (603) --;

Column 6,  
Line 56, "end", should read -- and --;

Column 7,  
Line 17, "(CMU),", should read -- (CMU), and wherein --; and  
Line 18, "and wherein the supervisor", should read -- the supervisor --.

Signed and Sealed this

Eighteenth Day of September, 2001

Attest:

NICHOLAS P. GODICI  
*Attesting Officer*  *Acting Director of the United States Patent and Trademark Office*